(12) United States Patent
Sugiyama

(10) Patent No.: US 10,821,644 B2
(45) Date of Patent: Nov. 3, 2020

(54) RUBBER EXTRUSION DEVICE AND METHOD FOR MANUFACTURING RUBBER EXTRUDATE

(71) Applicant: The Yokohama Rubber Co., LTD., Tokyo (JP)

(72) Inventor: Yuichi Sugiyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/486,789

(22) PCT Filed: Jan. 15, 2018

(86) PCT No.: PCT/JP2018/000859
§ 371 (c)(1),
(2) Date: Aug. 16, 2019

(87) PCT Pub. No.: WO2018/150782
PCT Pub. Date: Aug. 23, 2018

(65) Prior Publication Data
US 2019/0358882 A1    Nov. 28, 2019

(30) Foreign Application Priority Data
Feb. 16, 2017    (JP) .................. 2017-026512

(51) Int. Cl.
*B29C 48/31* (2019.01)
*B29D 30/00* (2006.01)
*B29C 48/92* (2019.01)

(52) U.S. Cl.
CPC .......... *B29C 48/31* (2019.02); *B29D 30/0061* (2013.01); *B29C 48/92* (2019.02);
(Continued)

(58) Field of Classification Search
CPC ...... B29C 48/31; B29C 48/92; B29D 30/0061
See application file for complete search history.

(56) References Cited

U.S. PATENT DOCUMENTS

2013/0334722 A1* 12/2013 Kitamura ................ B29C 48/92
  264/40.5
2017/0320282 A1    11/2017 Kitamura et al.

FOREIGN PATENT DOCUMENTS

| JP | S63-137824 | 6/1988 |
| JP | S63-207628 | 8/1988 |

(Continued)

OTHER PUBLICATIONS

International Search Report for International Application No. PCT/JP2018/000859 dated Apr. 3, 2018, 4 pages, Japan.

*Primary Examiner* — Jacob T Minskey
*Assistant Examiner* — Melody Tsui
(74) *Attorney, Agent, or Firm* — Thorpe North & Western

(57) ABSTRACT

A rubber extrusion device includes a head mounted with a die having: an extrusion port variable member disposed at a front end position of an extrusion flow path to move in a direction allowing an area of an extrusion port to change; and a rectifying body that enters and exits the extrusion flow path from a front end side of the extrusion flow path. A rubber extrudate is manufactured by: positioning the extrusion port variable member at a desired position in its movement direction; positioning the rectifying body at a desired position by moving the rectifying body in an extension direction of the extrusion flow path while being in contact with an inner wall of the extrusion flow path; and extruding unvulcanized rubber from the extrusion port by feeding the unvulcanized rubber into the extrusion flow path.

7 Claims, 5 Drawing Sheets

(52) U.S. Cl.
CPC ............... *B29C 2948/92304* (2019.02); *B29C 2948/92885* (2019.02); *B29C 2948/92904* (2019.02)

(56) References Cited

FOREIGN PATENT DOCUMENTS

| | | |
|---|---|---|
| JP | 2004-243732 | 9/2004 |
| JP | 2012-187712 | 10/2012 |
| JP | 2013-216069 | 10/2013 |
| KR | 20-0327463 | 9/2003 |
| WO | WO 2012/121148 | 9/2012 |

\* cited by examiner

RUBBER EXTRUSION DEVICE AND METHOD FOR MANUFACTURING RUBBER EXTRUDATE

TECHNICAL FIELD

The present technology relates to a rubber extrusion device and a method for manufacturing a rubber extrudate, and more particularly to a rubber extrusion device and a method for manufacturing a rubber extrudate, being capable of accurately manufacturing rubber extrudates in various desired shapes in a stable manner while reducing job labor required to replace a component when a rubber extrudate different in shape is manufactured.

BACKGROUND ART

When a rubber product such as a tire is manufactured, there is an extrusion step of extruding unvulcanized rubber using a rubber extrusion device. The rubber extrusion device plasticizes the unvulcanized rubber using a screw internally provided, and feeds it into an extrusion flow path formed in a die at a front end. The die is provided at the front end with a die having an extrusion port with a desired shape, and a rubber extrudate molded into a desired shape is manufactured by allowing the unvulcanized rubber to pass through the extrusion port. Various shapes are required for a rubber extrudate. To change a shape of the rubber extrudate, a die needs to be replaced with that having an extrusion port corresponding to the shape thereof.

When the rubber extrudate is frequently changed in shape, job labor for replacing a die increases to cause a disadvantage in improving productivity. Thus, there are proposed various structures for changing a shape of an extrusion port by sliding a slide member installed in a die (refer to Japan Unexamined Patent Publication Nos. 2004-243732 and 2012-187712), for example.

Each of the structures proposed in Japan Unexamined Patent Publication Nos. 2004-243732 and 2012-187712 has an advantage of enabling the extrusion port to be changed into a desired shape without replacing a die. While a rubber extrudate extruded by passing through an extrusion port swells (expands), a level of the swell also varies depending on a shape (size) of the extrusion port. Thus, it is difficult to accurately obtain a rubber extrudate having a desired shape by only replacing the extrusion port with that in the desired shape.

SUMMARY

The present technology provides a rubber extrusion device and a method for manufacturing a rubber extrudate, being capable of accurately manufacturing rubber extrudates in various desired shapes in a stable manner while reducing job labor required to replace a component when a rubber extrudate different in shape is manufactured.

A rubber extrusion device of the present technology includes: a cylinder in a tubular shape; a screw disposed in an internal space of the cylinder; a head having an extrusion flow path installed in a front end of the cylinder to communicate with the internal space; and a die attached to the head to constitute an extrusion port at a front end position of the extrusion flow path, the die having: an extrusion port variable member disposed at the front end position of the extrusion flow path to move in a direction allowing an area of the extrusion port to be changed; and a rectifying body that moves in an extension direction of the extrusion flow path while being in contact with an inner wall of the extrusion flow path to enter and exit the extrusion flow path from a front end side of the extrusion flow path; and the extrusion port variable member and the rectifying body being each configured to be able to be positioned at a desired position in its movement direction.

A method for manufacturing a rubber extrudate of the present technology includes the steps of: feeding a rubber material into an internal space of a cylinder in a tubular shape; mixing and kneading the rubber material while pressing the rubber material forward, using a screw disposed in the internal space, to form an unvulcanized rubber; feeding the unvulcanized rubber into an extrusion flow path formed in a head provided on a front end of the cylinder; and extruding the unvulcanized rubber as a rubber extrudate from an extrusion port formed by a die attached to the head, the die having: an extrusion port variable member disposed at a front end position of the extrusion flow path to move in a direction allowing an area of the extrusion port to be changed; and a rectifying body that enters and exits the extrusion flow path from a front end side of the extrusion flow path, a rubber extrudate in a desired shape being manufactured by the steps of: positioning the extrusion port variable member at a desired position in its movement direction; positioning the rectifying body at a desired position by moving the rectifying body in an extension direction of the extrusion flow path while being in contact with an inner wall of the extrusion flow path; and extruding the unvulcanized rubber from the extrusion port by causing the unvulcanized rubber to pass through the extrusion flow path.

According to the present technology, the die includes the extrusion port variable member that moves in a direction allowing an area of the extrusion port to be changed, so that the extrusion port can be changed into a desired shape by positioning the extrusion port variable member at a desired position in its movement direction. This enables rubber extrudates in various desired shapes to be extruded while reducing job labor required to replace a component when a rubber extrudate different in shape is manufactured.

The die also includes the rectifying body that moves in the extension direction of the extrusion flow path to enter and exit the extrusion flow path from the front end side of the extrusion flow path, so that a level of swell of the rubber extrudate extruded from the extrusion port can be controlled by positioning the rectifying body at a desired position in its movement direction while the rectifying body is in contact with the inner wall of the extrusion flow path. This enables the rubber extrudate to be accurately manufactured in a desired shape in a stable manner.

BRIEF DESCRIPTION OF DRAWINGS

FIG. 5 is an explanatory diagram schematically illustrating a state of a swell of a rubber extrudate.

DETAILED DESCRIPTION

Figure 1:
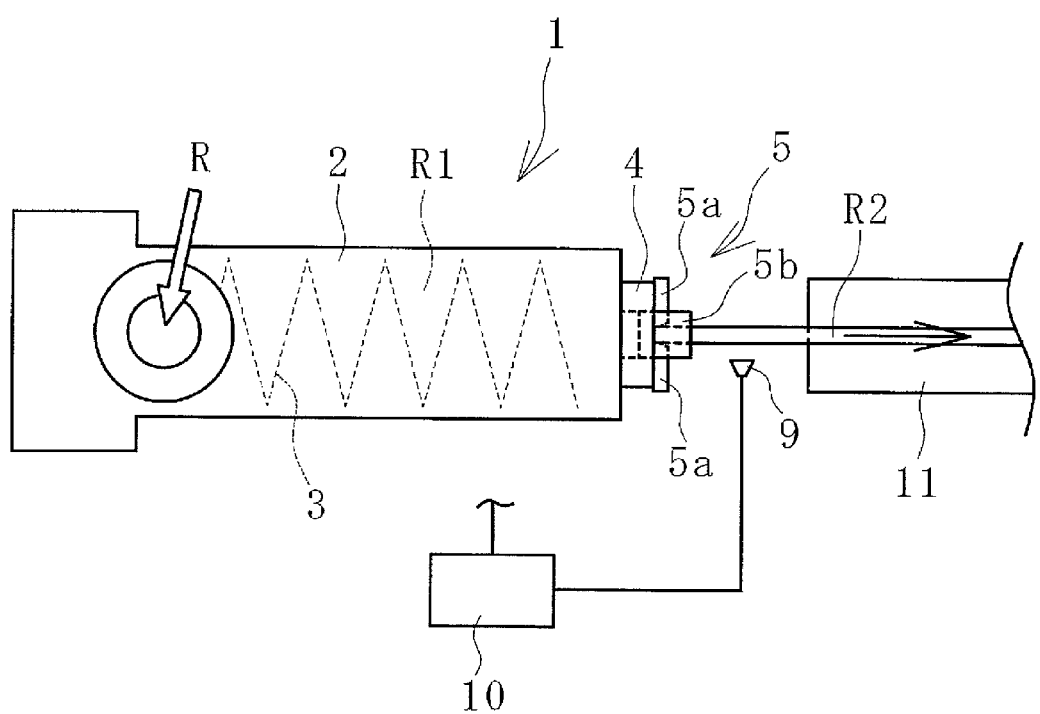
FIG. 1 is a plan view schematically illustrating a rubber extrusion device of the present technology.
Figure 2:
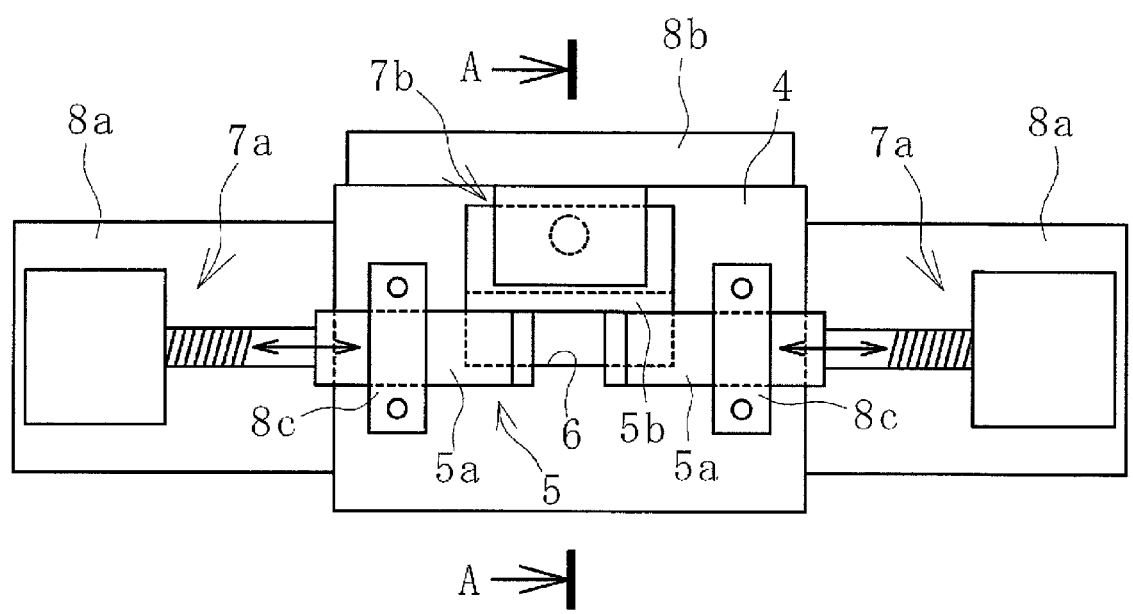
FIG. 2 is a front view illustrating a periphery of a head of FIG. 1.
Figure 3:
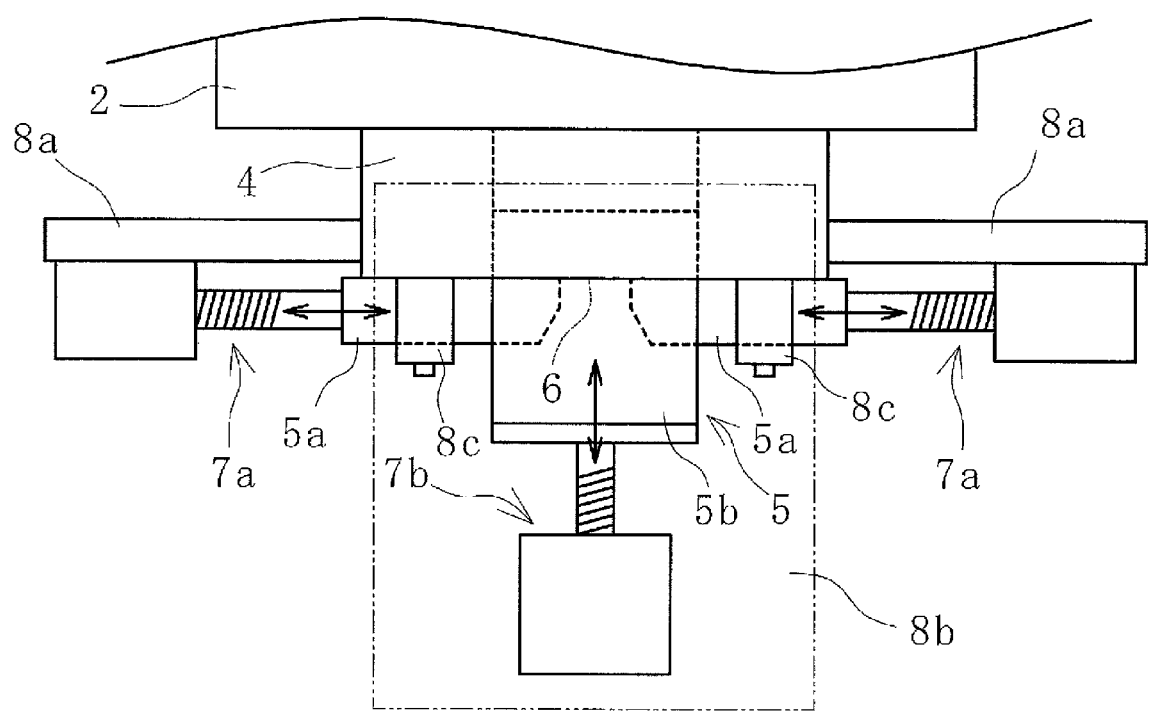
FIG. 3 is a plan view illustrating the periphery of the head of FIG. 1.
Figure 4:
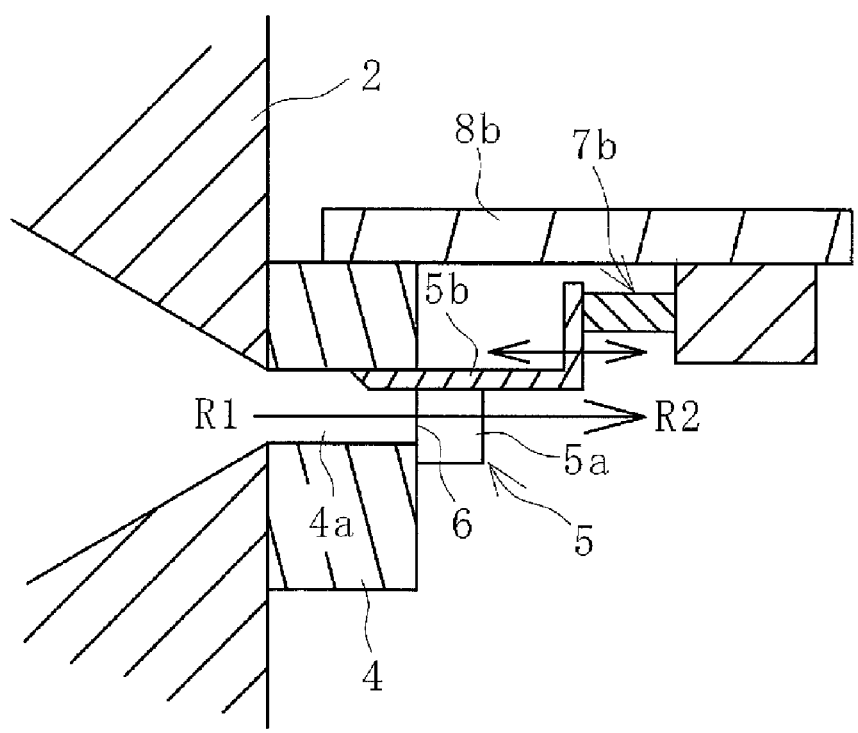
FIG. 4 is a cross-sectional view taken along line A-A of FIG. 2, illustrating the inside of the periphery of the head.

Hereinafter, a rubber extrusion device and a method for manufacturing a rubber extrudate of the present technology will be described with reference to an embodiment illustrated in drawings.

FIGS. 1 to 4 each exemplify a rubber extrusion device 1 of the present technology that includes a cylinder 2 in a tubular shape, a screw 3 disposed inside the cylinder 2, and a head 4 disposed at a front end of the cylinder 2. The head 4 is mounted with a die 5.

In the present embodiment, the rubber extrusion device 1 further includes a sensor 9, and a control unit 10 configured to receive detection data from the sensor 9. In front of the die 5, a conveyor device 11 is disposed to convey a rubber extrudate R2 extruded to a next step. Illustrations of actuators 7a, 7b and the like are eliminated in FIG. 1, and a fixing plate 8b is illustrated by a two-dot chain line in FIG. 3.

The cylinder 2 is provided in its front end portion with an internal space narrowing forward. The head 4 includes an extrusion flow path 4a passing through the head 4 forward and backward, and the extrusion flow path 4a communicates with the internal space of the cylinder 2. The extrusion flow path 4a has a length of 1 mm or more and 200 mm or less, for example.

At a front end position of the extrusion flow path 4a of the head 4, an extrusion port 6 is formed by the die 5. The die 5 includes an extrusion port variable member 5a disposed at the front end position of the extrusion flow path, and a rectifying body 5b that enters and exits the extrusion flow path 4a from a front end side of the extrusion flow path 4a. The rubber extrusion device 1 of the present embodiment includes two extrusion port variable members 5a disposed facing each other right and left on a front face of the die 5. The extrusion port variable members 5a each have a prism shape, for example, and have one front corner formed in a tapered shape in the present embodiment.

The extrusion port variable members 5a are held by respective holding members 8c attached to the front face of the head 4 to be movable in a lateral direction. The extrusion port variable members 5a are each disposed to be able to cover a front end opening of the extrusion flow path 4a.

The head 4 is mounted on its right and left side faces with respective fixing plates 8a projecting outward. The fixing plates 8a are each provided with an actuator 7a. When the actuators 7a are operated, the extrusion port variable members 5a are moved in a direction in which they are close to or away from each other. In the present embodiment, the actuators 7 each include a servo motor, and a ball screw that is rotated by the servo motor to move axially. When the actuators 7a moves the corresponding extrusion port variable members 5a, an area of the front end opening of the extrusion flow path 4a covered with the extrusion port variable members 5a is changed to change an area of the extrusion port 6.

The rectifying body 5b has a flat plate portion, and one surface of the flat plate portion is in contact with an inner wall of the extrusion flow path 4a. In the present embodiment, the flat plate portion has a rear end portion in a tapered shape inclining forward of the extrusion flow path 4a from the inner wall of the extrusion flow path 4a in contact with the rear end portion toward a central portion of the extrusion flow path 4a in cross section. The rectifying body 5b has a front end in a shape bent upward at an angle of approximately 90°.

The head 4 has an upper surface to which a fixing plate 8b is attached projecting forward of the head 4. The fixing plate 8b is provided on its lower surface with an actuator 7b. The actuator 7b operates to move the rectifying body 5b in contact with the inner wall of the extrusion flow path 4a in an extension direction (i.e., a longitudinal direction) of the extrusion flow path 4a. In the present embodiment, the actuator 7b includes a servo motor, and a ball screw that is rotated by the servo motor to move axially. When the rectifying body 5b is moved by the actuator 7b, a length of the rectifying body 5b inserted into the extrusion flow path 4a varies. The rectifying body 5b has an insertion length of 5 mm or more and 190 mm or less, for example.

The extrusion port variable members 5a and the rectifying body 5b are each configured to be able to be positioned and fixed at a desired position in its movement direction. Actuation of each of the actuators 7a, 7b is independently controlled by the control unit 10 based on detection data acquired by the sensor 9. This causes each of the extrusion port variable members 5a and the rectifying body 5b to be positioned at a desired position by control of the control unit 10. The actuators 7a, 7b are not limited to the mechanisms described above, and various mechanisms can be employed. For example, a hydraulic cylinder or the like can be used.

Hereinafter, procedure of a method for manufacturing a rubber extrudate of the present technology will be described.

When the rubber extrudate R2 is manufactured by the rubber extrusion device 1, a predetermined amount of rubber material R such as raw rubber and a compounding agent is fed into the internal space of the cylinder 2. The rubber material R is mixed and kneaded by the rotating screw 3. Unvulcanized rubber R1 mixed and kneaded is softened to some extent (plasticized) to be fed into the extrusion flow path 4a, and then extruded from the extrusion port 6 as a rubber extrudate R2 unvulcanized while being molded into a shape of the extrusion port 6. For example, the rubber extrudate R2, such as a strip shaped tire member formed into a predetermined shape, is manufactured according to the present technology.

At this time, the extrusion port variable members 5a are each positioned at a desired position in its movement direction, and the rectifying body 5b in contact with the inner wall of the extrusion flow path 4a is moved in the extension direction of the extrusion flow path 4a to be positioned at a desired position. The unvulcanized rubber R1 extruded forward by the screw 3 passes through the extrusion flow path 4a into which the rectifying body 5b is inserted at a desired length. The front end opening of the extrusion flow path 4a has an area set to a predetermined size by the extrusion port variable member 5a, and the extrusion port 6 is formed into a desired shape by the die 5.

According to the present technology, the unvulcanized rubber R1 is extruded from the extrusion port 6 formed into the desired shape to manufacture the rubber extrudate R2 having the desired shape. The rubber extrudate R2 is conveyed to a next step by the conveyor device 11 for transfer while being extruded.

The rubber extrudate R2 generally swells (expands) immediately after extrusion, and thus is not formed into a desired shape similar to that of the extrusion port 6. In contrast, according to the present technology, a level of swell of the rubber extrudate R2 is controlled by inserting the rectifying body 5b into the extrusion flow path 4a and controlling an insertion length thereof. In other words, the level of swell of the rubber extrudate R2 is controlled by adjusting a length (area) of the unvulcanized rubber R1 in contact with the rectifying body 5b in the extrusion flow path 4a.

Figure 5A:
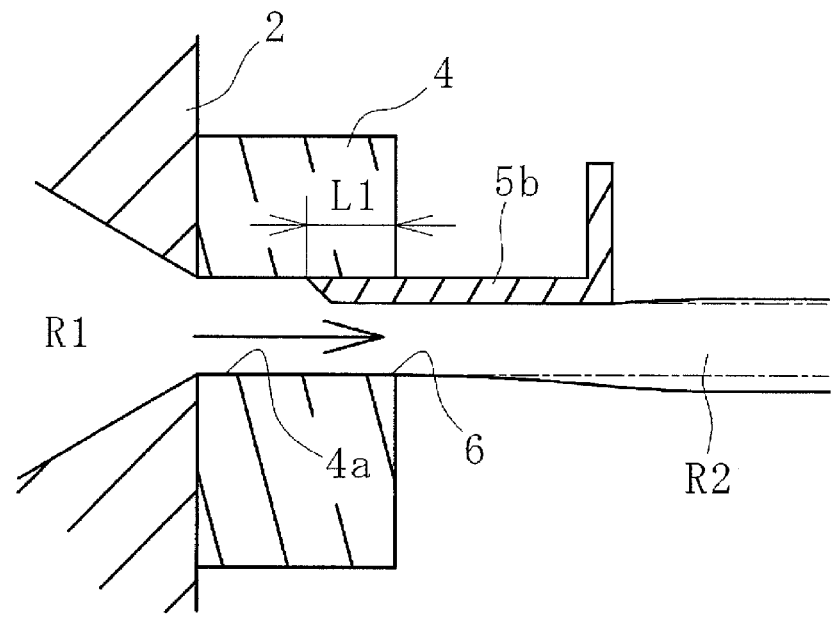
FIG. 5A is a longitudinal sectional view illustrating a case where a rectifying body has a short insertion length.
Figure 5B:
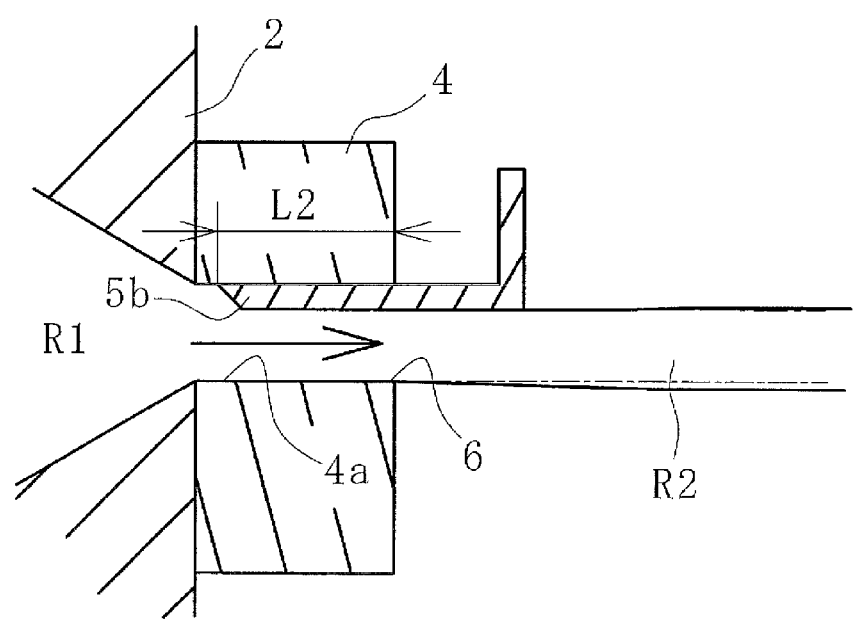
FIG. 5B is a longitudinal sectional view illustrates a case where the rectifying body has a long insertion length.

As illustrated in FIG. 5A, when the insertion length L1 of the rectifying body 5b with respect to the extrusion flow path 4a is relatively short, an effect of suppressing the swell of the rubber extrudate R2 decreases. On the other hand, as illustrated in FIG. 5B, when the insertion length L2 (L2>L1) of the rectifying body 5b with respect to the extrusion flow path 4a is relatively long, the effect of suppressing the swell of the rubber extrudate R2 increases. In each of FIGS. 5A and 5B, the rubber extrudate R2 without swell is illustrated by a dot-dash line.

For example, only an insertion length of the rectifying body 5b with respect to the extrusion flow path 4a is varied to manufacture a rubber extrudate R2 of a few square centimeters with a kind of rubber used in a tire by using the same rubber extrusion device 1, and then a swell ratio (expansion ratio of volume per unit length) of the rubber extrudate R2 is measured to acquire measurement results as follows.

When the rectifying body 5b had insertion lengths of 6 mm, 12 mm, and 24 mm, the swell ratios were 144%, 129%, and 113%, respectively. As described above, as the insertion length of the rectifying body 5b increases, the swell ratio decreases. However, when the insertion length increases to a predetermined value or more, the swell ratio does not change almost. Thus, increasing the insertion length of the rectifying body 5b more than necessary does not obtain a practical benefit.

The level of swell varies depending on the specifications (shape, size, rubber physical properties, and the like) of the rubber extrudate R2, and thus the insertion length of the rectifying body 5b with respect to the extrusion flow path 4a is appropriately set in accordance with the specifications of the rubber extrudate R2. According to the present embodiment, a shape (a width dimension and a thickness dimension) of the rubber extrudate R2 immediately after extrusion is detected by the sensor 9. The control unit 10 receives a target value of the shape (the width dimension and the thickness dimension) of the rubber extrudate R2, and controls a position of each of the extrusion port variable members 5a and an insertion length of the rectifying body 5b with respect to the extrusion flow path 4a to reduce a difference between the detection data and the target value.

According to the present technology, when the rubber extrudate R2 different in shape is manufactured, the extrusion port 6 may be changed into a desired shape by positioning the extrusion port variable member 5a at a desired position. Accordingly, a die does not need to be frequently replaced unlike the conventional art, so that rubber extrudates R2 having various desired shapes can be extruded while reducing job labor required for replacement of a component.

In addition, positioning the rectifying body 5b at a desired position enables a level of swell of the rubber extrudate R2 to be controlled. This is advantageous to accurate and stable manufacture of the rubber extrudate R2 in a desired shape. In other words, the rubber extrudate R2 can be changed in shape by adjusting an insertion length of the rectifying body 5b with respect to the extrusion flow path 4a.

When a rear end portion of the rectifying body 5b has a tapered shape as in the present embodiment, the unvulcanized rubber R1 can smoothly pass through the extrusion flow path 4a without large turbulence when the unvulcanized rubber R1 is brought into contact with the rectifying body 5b. This enables unnecessary pressure loss (flow path resistance) to be suppressed.

When the rubber extrudate R2 to be a tire component is manufactured according to the present technology, for example, the rubber extrudate R2 can be accurately formed into a desired shape. Thus, when a tire is manufactured using this rubber extrudate R2, it is advantageous to improve the tire in uniformity.

While the extrusion flow path 4a has a quadrangular cross-sectional shape in the present embodiment, various shapes can be used besides this shape. Thus, the rectifying body 5b is formed into a shape along an inner wall surface of an extrusion flow path 4a in accordance with a cross-sectional shape of the extrusion flow path 4a.

The number of the extrusion port variable members 5a is not limited to two, and can be one, or three or more. For example, four extrusion port variable members 5a may be provided facing each other up and down, and left and right, with respect to the extrusion flow path 4a. In this case, the rubber extrudate R2 can be easily changed in width and thickness to be set to desired dimensions.

The number of the rectifying body 5b is not limited to one, and may be two or more. For example, two rectifying bodies 5b can be provided facing each other up and down.

The invention claimed is:

1. A rubber extrusion device comprising:
   a cylinder in a tubular shape;
   a screw disposed in an internal space of the cylinder;
   a head having an extrusion flow path installed in a front end of the cylinder to communicate with the internal space; and
   a die attached to the head to constitute an extrusion port at a front end position of the extrusion flow path,
   the die having:
   at least one extrusion port variable member disposed at the front end position of the extrusion flow path to move in a direction allowing an area of the extrusion port to be changed; and
   a rectifying body that moves in an extension direction of the extrusion flow path while being in contact with an inner wall of the extrusion flow path to enter and exit the extrusion flow path from a front end side of the extrusion flow path, and
   the at least one extrusion port variable member and the rectifying body being each configured to be able to be positioned at a desired position in its movement direction.

2. The rubber extrusion device according to claim 1, wherein the rectifying body has a rear end portion in a tapered shape inclining forward of the extrusion flow path from the inner wall of the extrusion flow path in contact with the rear end portion toward a central portion of the extrusion flow path in cross section.

3. The rubber extrusion device according to claim 1, further comprising:
   two extrusion port variable members including the at least one extrusion port variable member, being disposed facing each other, wherein
   the two extrusion port variable members are moved in a direction in which the two extrusion port variable members are close to or separated from each other to change an area of the extrusion port, and
   the rectifying body moves in the extension direction of the extrusion flow path while being in contact with a surface of each of the two extrusion port variable members.

4. The rubber extrusion device according to claim 1, further comprising:
   a sensor that detects a shape of a rubber extrudate extruded from the extrusion port; and
   a control unit configured to control a position of each of the two extrusion port variable members and the rectifying body, in its movement direction, based on detection data acquired by the sensor.

5. A method for manufacturing a rubber extrudate, the method comprising the steps of:
   feeding a rubber material into an internal space of a cylinder in a tubular shape; mixing and kneading the rubber material while pressing the rubber material forward, using a screw disposed in the internal space, to form an unvulcanized rubber;
   feeding the unvulcanized rubber into an extrusion flow path formed in a head provided on a front end of the cylinder; and
   extruding the unvulcanized rubber as a rubber extrudate from an extrusion port formed by a die attached to the head,
   the die having:
   an extrusion port variable member disposed at a front end position of the extrusion flow path to move in a direction allowing an area of the extrusion port to be changed; and
   a rectifying body that enters and exits the extrusion flow path from a front end side of the extrusion flow path,
   a rubber extrudate in a desired shape being manufactured by the steps of:
   positioning the extrusion port variable member at a desired position in its movement direction;
   positioning the rectifying body at a desired position by moving the rectifying body in an extension direction of the extrusion flow path while being in contact with an inner wall of the extrusion flow path; and
   extruding the unvulcanized rubber from the extrusion port by causing the unvulcanized rubber to pass through the extrusion flow path.

6. The rubber extrusion device according to claim 2, further comprising:
   two extrusion port variable members including the at least one extrusion port variable member, being disposed facing each other, wherein the two extrusion port variable members are moved in a direction in which the two extrusion port variable members are close to or separated from each other to change an area of the extrusion port, and
   the rectifying body moves in the extension direction of the extrusion flow path while being in contact with a surface of each of the two extrusion port variable members.

7. The rubber extrusion device according to claim 6, further comprising:
   a sensor that detects a shape of a rubber extrudate extruded from the extrusion port; and
   a control unit configured to control a position of each of the two extrusion port variable members and the rectifying body, in its movement direction, based on detection data acquired by the sensor.

\* \* \* \* \*